Sept. 17, 1963 R. J. COFFEY ET AL 3,104,008
TRANSFER DEVICE
Filed May 22, 1961 5 Sheets-Sheet 1

INVENTORS
Ralph J. Coffey
Arthur G. Radacille
BY
ATTORNEYS

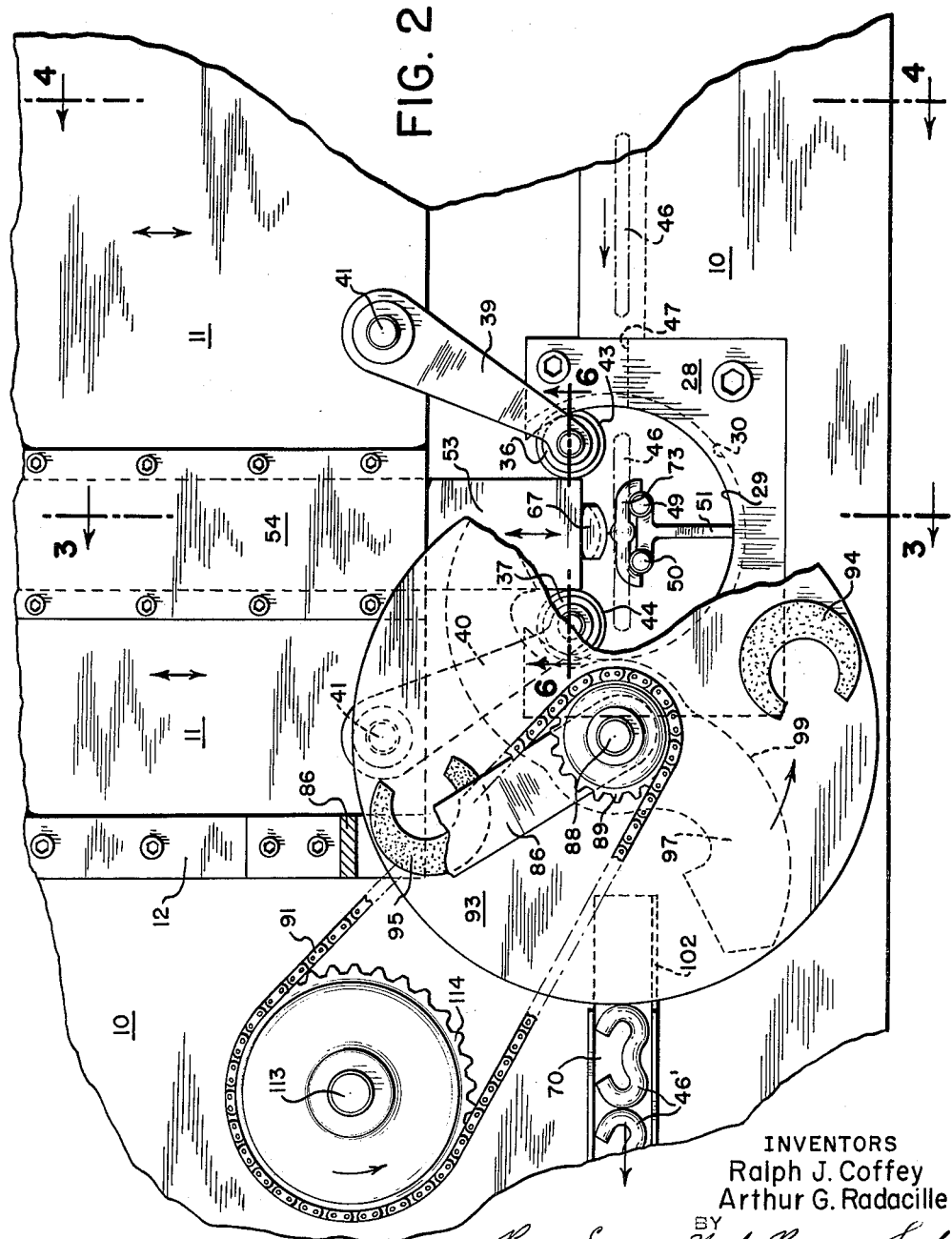

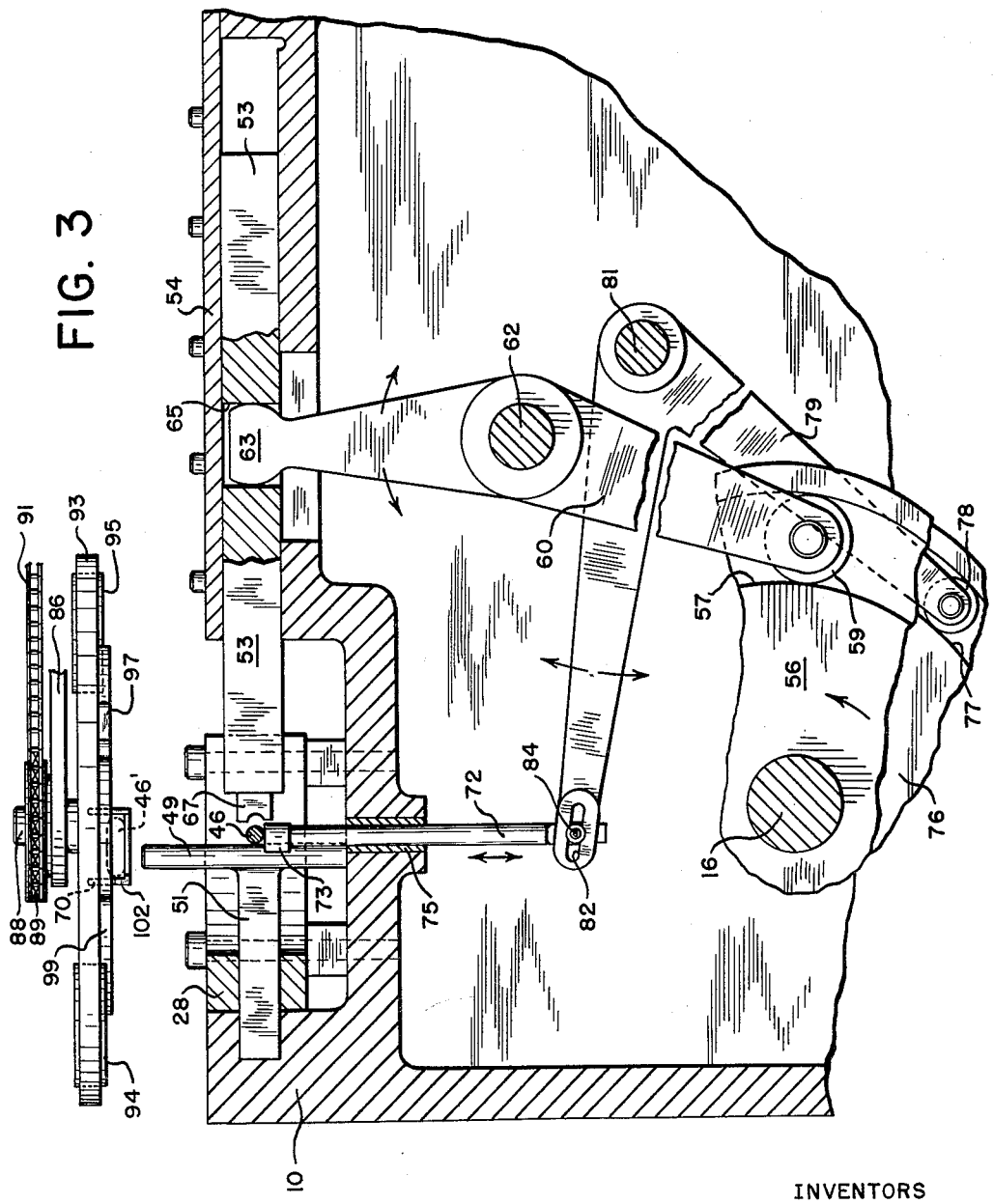

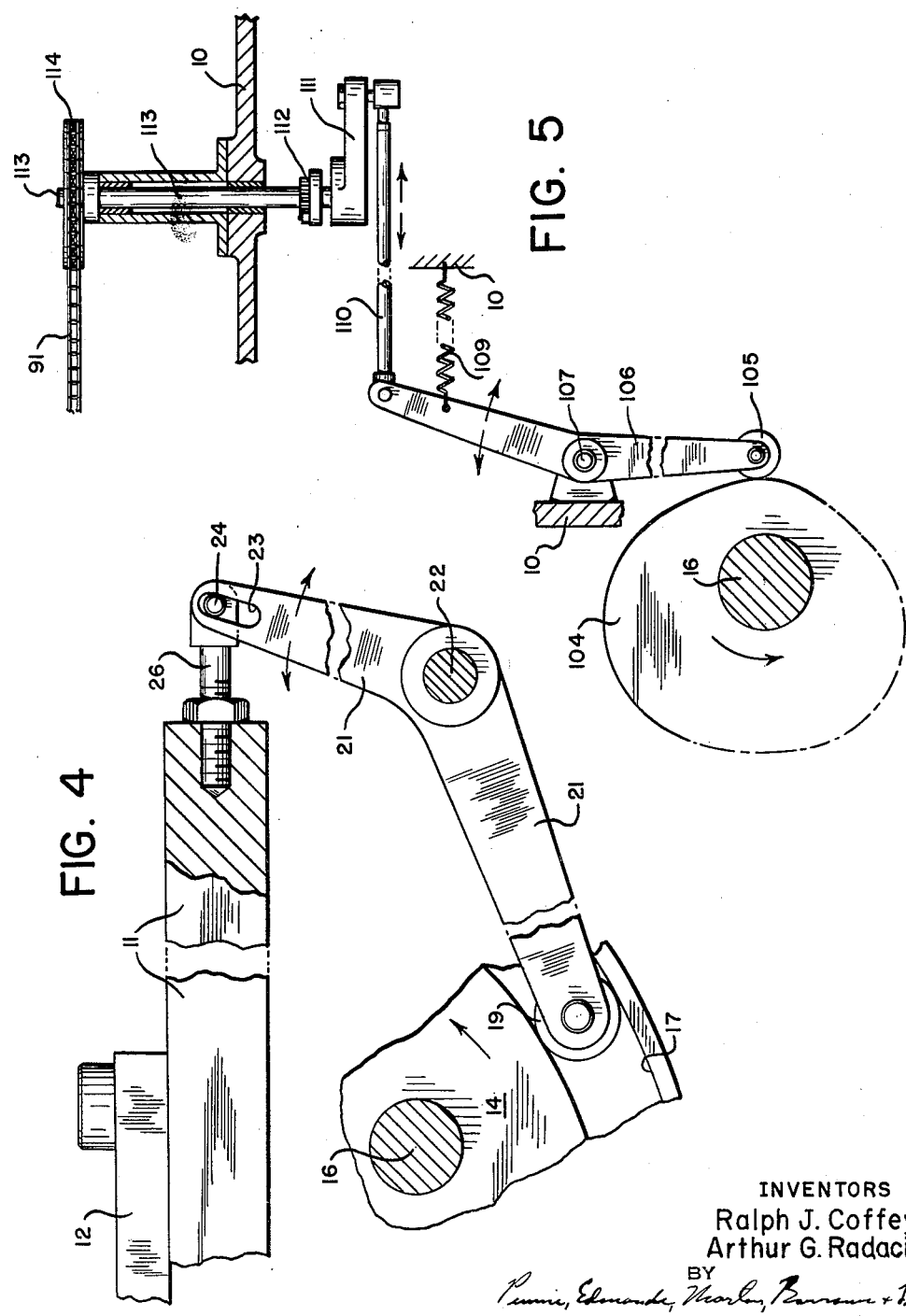

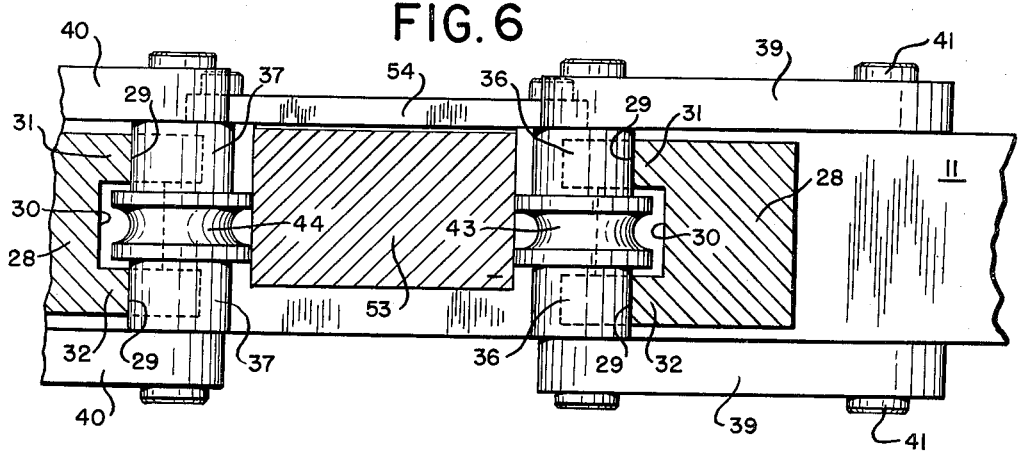
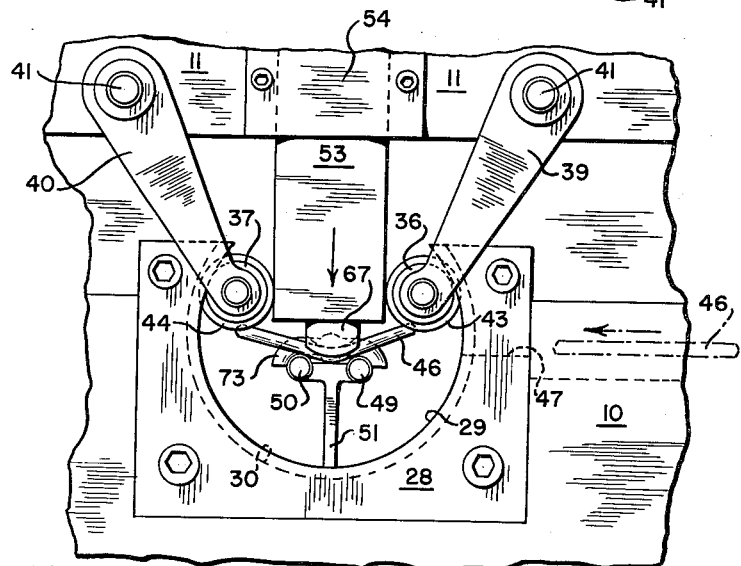
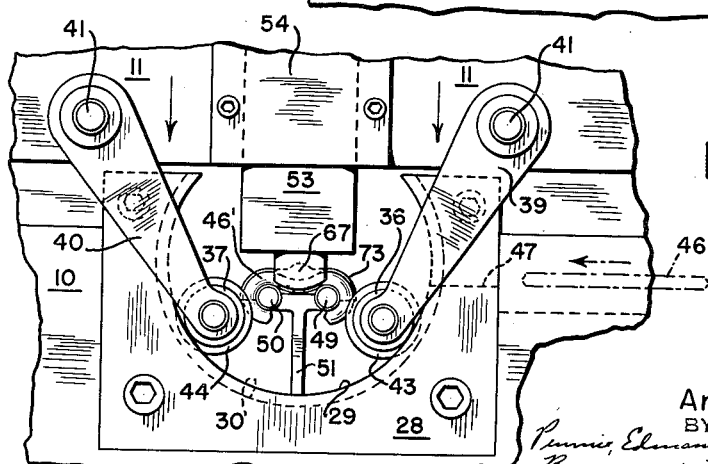

United States Patent Office 3,104,008
Patented Sept. 17, 1963

3,104,008
TRANSFER DEVICE
Ralph J. Coffey and Arthur G. Rudacille, York, Pa., assignors to American Chain & Cable Company, Inc., a corporation of New York
Filed May 22, 1961, Ser. No. 111,564
8 Claims. (Cl. 198—41)

This invention relates to devices for transferring articles from one station to another during their manufacture. More particularly, it relates to a transfer device for use in the manufacture of articles of magnetic material (such as iron or steel) by which such articles are successively taken from a first station by a magnetic rotatable carrier and deposited at the desired second station.

In automatic machinery, synchronized transfer mechanisms are often required to move work pieces quickly and surely from one station to the next with a minimum of complication. It is particularly difficult to keep such mechanisms of simple design when the work pieces are to follow a path other than a regular straight or circular course. For example, metal articles are often formed between dies or about core elements or in other confined spaces at a given station. Then, they must be taken to other stations by a transfer which can only be accomplished by withdrawing the article in one direction from its confined forming station and displacing it in a different direction to the next station. Simple translating or rotating carrier mechanisms are not presently available which can negotiate multi-directional transferrals of this sort.

In general, it is the purpose of this invention to provide a transfer device of uncomplicated design which with minor modifications can serve in various machines and processes. The new device is one which can take a formed metal article from a confined position and, after a marked change in direction, can deliver it to another station which may be removed from and at a different elevation with respect to the forming station. In particular, it is contemplated that the transfer device of the invention be incorporated in apparatus where articles of magnetic material (such as the steel lugs which are made into chain links) are formed successively about an upright post and then must be delivered to another station above and spaced from their point of formation. In the manufacture of chain, for example, short lengths of rod or the like are often formed about posts when they are to be bent into C-shaped or horseshoe configuration and, in many instances, it is impossible to remove such formed articles from the post except by sliding them off the upper end thereof.

Broadly stated, the invention provides apparatus for transferring articles of magnetic material from a first to a second station. The new apparatus comprises a rotatable carrier element and at least one magnet positioned thereon to revolve closely past both the stations upon rotation of the carrier element. Displacement means are included at the first station for moving each article onto the magnet when the magnet is adjacent thereto. A stripping element is provided at the second station for removing each article from the magnet and depositing it at the second station. Synchronized driving means are included for actuating the carrier element and the displacing means.

An article-displacing cam may be positioned on the carrier element to move each article successively from the second station. When the new transfer device is incorporated in apparatus wherein articles are formed about an upright post, the above-mentioned displacement means preferably comprises a lifting element normally positioned at the base of the post. Such lifting element is movable immediately alongside the post to the upper end thereof to lift the formed article therefrom onto the magnet. The synchronized driving means may be a plurality of driving cams mounted about a common rotatable shaft. These cams actuate the lifting element and the rotatable carrier element in such a manner that both elements pause while the article is formed about the post, then the lifting element elevates the formed article along the post up to the magnet. Next, the carrier element rotates to the discharge station where the article on the magent is stripped therefrom, and finally the article-displacing cam on the carrier element urges the article off the discharge station to make room for the next article to be transferred.

A preferred embodiment of the new apparatus is described hereinbelow with reference to the accompanying drawings, wherein FIG. 1 is a perspective view partly broken away of apparatus for forming an article about upright posts in combination with the new transfer device;

FIG. 2 is a fragmentary plan view partly broken away of the apparatus of FIG. 1;

FIG. 3 is a fragmentary section taken along the line 3—3 of FIG. 2;

FIG. 4 is a section partly broken away taken along the line 4—4 of FIG. 2;

FIG. 5 is a section partly broken away of the means for rotating the carrier element;

FIG. 6 is an enlarged fragmentary section taken along the line 6—6 of FIG. 2;

FIG. 7 is a fragmentary plan view of the forming apparatus before the article is formed about the posts; and FIG. 8 is a fragmentary plan view of the forming apparatus midway in the forming stroke.

Figure 1:
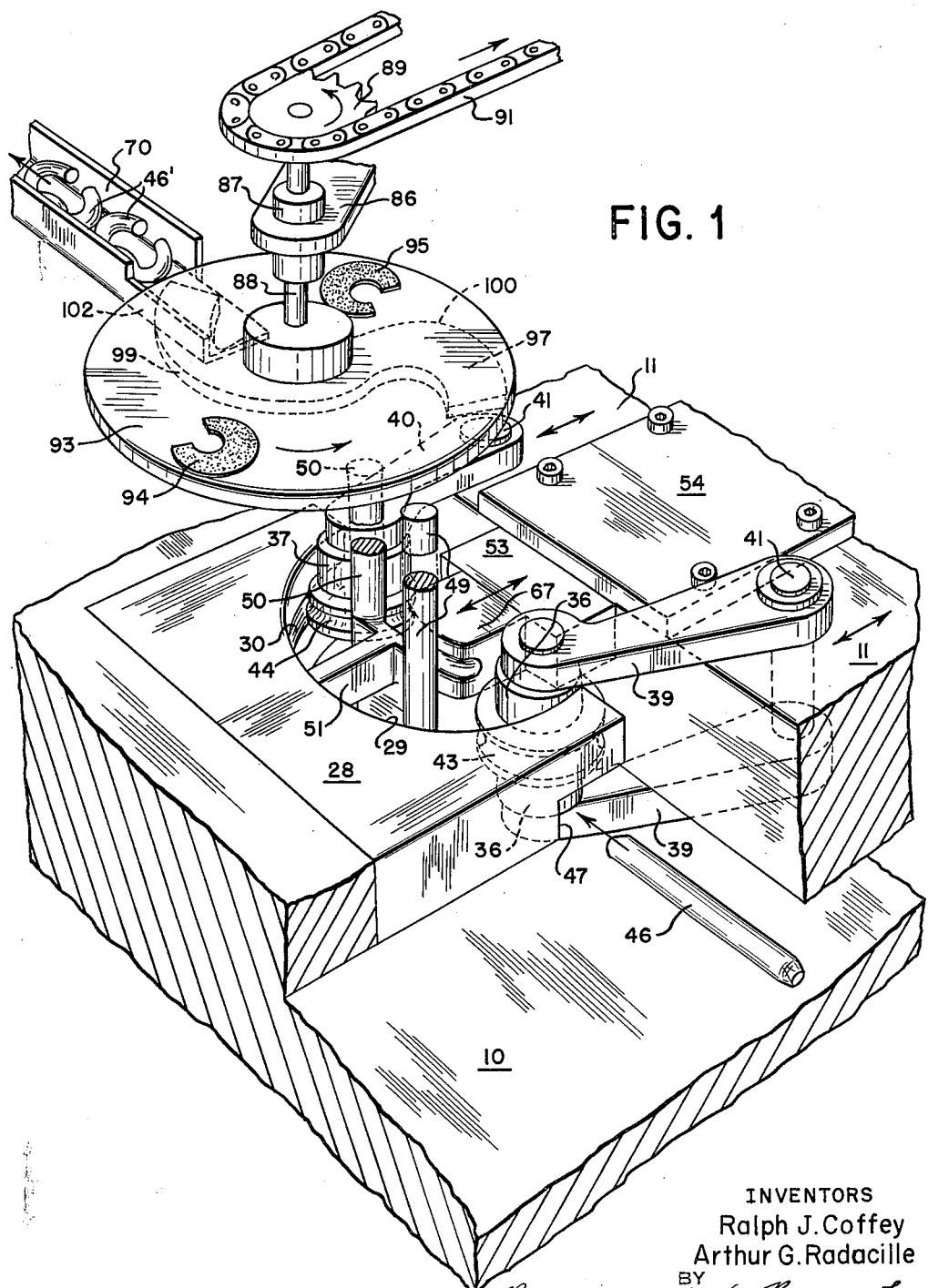

Referring first to FIGS. 1 and 2, the forming apparatus with which this new transfer device is associated includes a stationary frame 10 and a primary movable slide 11. The slide 11 is held on the upper surface of the frame 10 by parallel plates 12 overlying the edge portions of the slide. As shown in FIG. 4, the slide 11 is displaceable on the frame 10 by means of a rotatable groove cam 14 affixed to a driving shaft 16 within the frame. A continuous groove 17 is formed in the cam 14 to receive a roller-type follower 19 rotatably mounted at the end of a bell-crank 21 which is pivoted about a stationary shaft 22. The opposite end of the bell-crank 21 defines a slot 23 which receives a pin 24 rigidly affixed to the slide 11 by a screw-threaded support 26. Rotation of the main shaft 16 thereby causes the slide 11 to be translated back and forth over the frame 10. As is discussed hereinbelow, the cam 14 is specially configured to impart the desired cyclic movement to the slide 11.

Firmly mounted in the frame 10 is a block 28 which is disposed opposite the center of the end portion of the slide 11. In its cyclic movement back and forth, the slide 11 moves toward and away from the block 28. As shown in FIGS. 2 and 7, the block 28 defines a circular cutout portion 29 which has an open end facing the slide 11. Within this cutout portion 29 is formed a groove 30 defined on either side by hardened wear-resistant shoulders 31 and 32.

A pair of rollers 36 and 37 are in rolling engagement with the wear-resistant shoulders 31 and 32 defining the inner circumference of the cutout portion 29 of the block 28. The rollers 36 and 37 are each supported at their opposite ends by respective pairs of arms 39 and 40. The arms of each pair are disposed one above and one below the block 28 at their outer ends and at their opposite ends are pivotally attached to the forward edge of the slide 11 by means of pins 41. By this construction, displacement of the slide 11 causes the arms 39 and 40 to force the rollers 36 and 37 about the inside of the cutout portion 29 between the limits of travel shown in FIGS. 7 and 8.

The rollers 36 and 37 include central circularly grooved rolling dies 43 and 44 respectively. The dies 43 and 44 are coaxial with their corresponding rollers and are of greater diameter; hence, they extend into the groove 39 formed about the inside of the cutout portion 29. The cross section of the circular grooves in the roller dies 43 and 44 corresponds to that of the various short lengths of rod stock 46 of magnetic material which are to be formed by this apparatus. In any suitable manner, the stock 46 is fed successively over the frame 10 into an aperture 47 in the block 28, as shown in FIGS. 1 and 2.

In their retracted position, the rollers 36 and 37 permit each piece of stock 46 to be successively placed at the center of the cutout portion 29 as shown in dotted lines in FIG. 2. In this position of the stock, it is horizontal and disposed against two vertical cylindrical posts 49 and 50 extending rigidly upwardly from the frame 10. A lateral buttress 51 extends outwardly from the center of the cutout portion 29 opposite the open end thereof, and is formed with a T-shaped end portion affixed to the posts 49 and 50.

When a length of the stock 46 is in the position shown in dotted lines in FIG. 2, it is directly opposite the central portion of the slide 11. Slidably mounted within this central portion of the slide 11 is a secondary slide 53 which is displaceable relative thereto beneath an overlying plate 54. Movement of the secondary slide 53 is independent of the movement of the primary slide 11, though both move along the same center line toward and away from the block 28. The secondary slide 53 is actuated by a cam 56 (FIG. 3) affixed to the main drive shaft 16. The cam 56 has a continuous groove 57 formed about its face in which is received a roller-type follower 59 rotatably mounted at one end of a bell-crank 60. The bell-crank 60 is pivotally mounted on a shaft 62 and its upper end 63 extends through the frame 10 into a socket 65 formed within the secondary slide 53. Thus, rotation of the main driving shaft 16 causes the bell-crank 60 to oscillate and displace the secondary slide 53 cyclically toward and away from the positioned piece of stock 46. At the outer end of the secondary slide 53 is a hardened nose portion 67 which extends forward to press against and deform the central portion of the positioned stock 46 when the secondary slide is at its outermost limit of travel. The cam groove 57 is also specially configured to impart the desired cyclic movement to the secondary slide 53 as discussed hereinbelow.

The operation of this forming apparatus is best described with reference to FIGS. 2, 3, 7 and 8. Initially, the primary and secondary slides 11 and 53 are in their rearwardmost position so that the rollers 36 and 37 and the nose element 67 are retracted. A piece of stock 46 is first fed in any suitable manner to the dotted line position shown in FIG. 2 against the base portion of the vertical posts 49 and 50. Since the main drive shaft 16 is constantly rotated at a uniform rate the cam grooves 17 and 57 must be configured to hold the primary and secondary slides 11 and 53 stationary while the stock 46 is positioned in this manner. Then, while the groove 17 continues to maintain the primary slide 11 stationary in its initial position, the groove 57 causes the secondary slide 53 to move forwardly into the position shown in FIG. 7. Thus, the nose element 67 presses against the central portion of the posts 49 and 50 and bends it into the shallow V-shape shown in FIG. 7.

As soon as this is done, the primary slide 11 moves forwardly and causes the rollers 36 and 37 to travel about the cutout portion 29 of the block 28 to the position shown in FIG. 8. When the rollers 36 and 37 are displaced in this manner, the opposite ends of the stock 46 extending beyond the posts 49 and 50 are engaged by the grooves in the roller dies 43 and 44 respectively and are wrapped about the posts as shown in FIG. 8. Next, the grooves 17 and 57 cause both the primary and secondary slides 11 and 53 to retract to their initial position shown in FIG. 2 and a formed piece of stock 46′ is left about the posts 49 and 50.

The grooves 17 and 57 then hold the primary and secondary slides 11 and 53 stationary for a brief time while the formed piece of stock 46′ (FIG. 8) is removed from the posts and transferred to its next station. At this point, the new transfer device comes into operation to displace the formed work piece 46′ from the posts and carry it to a discharge channel 70 spaced from and at a different elevation with respect to the forming station. The transfer device of the invention is fully described below.

The element upon which the stock 46 is positioned within the cutout portion 29 is a lifting member 72 extending upwardly through the frame 10 as shown in FIG. 3. At the upper end portion of the lifting member 72 is an integral supporting element 73 (see FIG. 2) which directly underlies the formed stock. The supporting element 73 is sufficiently small so as not to interfere with the operation of the rollers 36 and 37 and yet provides a suitably extensive top surface to support the piece of stock 46 both before and after the forming steps.

As shown in FIG. 3, the lifting member 72 is slidably mounted on the frame 10 in a bushing 75. The lifting member 72 is displaceable by means of a groove cam 76 which is affixed to the main drive shaft 16. A groove 77, the configuration of which is described hereinbelow, is formed therein to receive a roller-type follower 78 mounted at the end of one arm of a bell-crank 79. The bell-crank 79 is pivotally mounted on a shaft 81 and at its opposite end defines a slot 82 which receives a lateral pin 84 projecting from the lower end of the lifting member 72. Hence, rotation of the main drive shaft 16 causes oscillation of the bell-crank 79 and thereby cyclically raises and lowers the lifting member 72. This causes the supporting element 73 on the lifting member to move from its position shown in FIG. 3 upwardly immediately alongside the posts 49 and 50 to an upper position adjacent the top of the posts. At its upper position, the formed piece of stock 46′ is substantially clear of the posts 49 and 50.

In FIGS. 1 and 2, the end portion of a stationary bracket 86 is shown projecting over the forming station. The bracket 86 may be mounted to the frame 10 in any manner. At its outer end, is a journal bearing 87 in which is mounted a vertical shaft 88. At the upper end of the shaft 88 above the bracket 86 is mounted a sprocket 89 adapted to be driven by a chain 91. The lower end of the shaft 88 coaxially supports a carrier disc 93. The axis of the carrier disc 93 (which is also the axis of the shaft 88) is vertical and is spaced substantially in-line with and equidistantly between the posts 49 and 50 and the adjacent end portion of the discharge channel 70. Also, the disc 93 extends over both the posts and the end portion of the discharge channel.

Mounted in diametrically opposed peripheral portions of the disc 93 are a pair of horseshoe magnets 94 and 95. The magnets 94 and 95 are exposed on the underside of the disc 93 at points thereon adapted to pass directly over the posts 49 and 50 and the end portion of the discharge channel 70. Also affixed to the underside of the disc 93 is an S-shaped article-displacing cam 97, the opposite end portions of which are disposed circumferentially between the magnets 94 and 95. The ends of the cam 97 describe working surfaces 99 and 100 respectively which curve away from the preceding magnet to the periphery of the disc 93 and extend below the underside of the disc.

The end portion of the discharge channel 70 projecting beneath the disc 93 is cut away (as shown in FIG. 1) so that one of its side walls forms a stripping element 102 while the opposite side wall is removed entirely. The stripping element 102 extends upwardly into the path of any formed piece of stock 46′ clinging to either of the magnets, and yet it does not interfere with the article-displacing cam 97. Hence, a piece of stock carried on either magnet will be intercepted by the stripping element 102 when the magnet passes over the end portion of the discharge channel 70, and that particular article will be removed from the carrier disc 93 and deposited in the discharge channel 70. However, the strip element 102 is low enough that any such formed piece of stock so deposited on the end portion of the discharge channel 70 extends above the stripping element 102 into the path of the article-displacing cam 97. As a result, shortly after an article is stripped onto the end portion of the channel as described, the working surface 99 or 100 of the cam 97, which follows will push it along the channel 70 to displace it off the end portion thereof and so make room for the next work piece.

Referring to FIG. 5, means are shown for actuating the carrier disc 93. These means include a cam 104 affixed to the main drive shaft 16. The periphery of the cam 104 engages a roller-type follower 105 at one end of a bell-crank 106 which is pivotally mounted on a pin 107 affixed to a portion of the frame 10. A tension spring 109 is attached to the bell-crank 106 to urge the roller 105 against the cam 104. At the end of the bell-crank 106 opposite the roller 105 is a connecting rod 110 pivotally attached to the end of a crank 111. The crank 111 is affixed to and adapted to rotate a pawl element of a rachet and pawl assembly 112. A shaft 113 journalled in the frame 10 extends from the rachet element of this assembly and is adapted to be rotated thereby a quarter-turn in one direction only when the cam 104 pivots the bell-crank 106 from one extreme position to the other. At the opposite end of the shaft 113 is a sprocket 114 which drives the chain 91 and thus rotates the shaft 88 which carries the disc 93. By this construction, rotation of the cam 104 causes the bell-crank 106 to oscillate periodically and thereby rotate the shaft 113 through 90°. A chain 91 imparts this rotation to the disc 93 with a 2:1 reduction so that the disc 93 rotates a half-turn whenever the cam 104 moves the bell-crank 106 from one extreme to the other.

The operation of the new transfer device is as follows: The cam 104 is configured so that it holds either of the magnets 94 or 95 directly over the posts 49 and 50 during the forming operation described previously. Also, the cam 76 is configured to hold the lifting member 72 stationary in its lowest position during the forming operation so that the supporting element 73 can properly position the stock.

As soon as the primary and secondary slides 11 and 53 have been retracted and have left the formed piece of stock 46' wrapped about the posts 49 and 50, the rotating cam 76 causes the lifting member 72 to move upwardly alongside the posts. This elevates the formed stock 46' along the posts 49 and 50 and off the upper ends thereof onto the magnet (for example, the magnet 94) which is stationary above the posts. When the magnet 94 has grasped the formed piece of stock 46', the rotating cam 104 causes the shaft 113 to be turned through 90°. This, in turn, rotates the carrier disc 93 a half-turn (due to the 2:1 reduction between sprocket wheels 114 and 89) and moves the magnet 94, with the formed piece of stock attached thereto, around to a position directly over the end portion of the discharge channel 70. The other magnet 95 is thereby caused to make a half-revolution around to a position directly over the posts 49 and 50.

While the disc 93 is describing a half-revolution in this manner, the cam 76 causes the lifting member 72 to be lowered downwardly to its original position shown in FIG. 3. Consequently, when the magnet 95 comes around to a position over the posts 49 and 50, the lifting member 72 is completely lowered and another piece of stock 46 may be positioned adjacent the posts for the next forming operation. During the next forming operation both the lifting member 72 and the disc 93 are held stationary. Then when the next forming operation is completed the lifting member again rises and the disc 93 makes another half-turn. At the commencement of this next half-turn of the disc 93, the formed piece of stock 46' previously attached to the magnet 94 is stripped therefrom by the stripping element 102 and is caused to drop onto the end portion of the discharge channel 70. About midway in this half-turn of the disc, the working surface 99 of the article-displacing cam 97 crosses over the end portion of the discharge channel 70 and thereby urges the formed piece of stock outwardly along the channel to make room for the next piece of stock coming around on the magnet 95. This synchronized operation of the transfer device is cyclically repeated to remove each successive work piece from the posts 49 and 50 to the discharge channel 70.

We claim:

1. Apparatus for transferring articles of magnetic material from a first to a second station comprising a carrier element rotatably mounted about an axis substantially equidistant from said stations, at least one magnet positioned on said carrier element to revolve closely past both of said stations upon rotation of said carrier element, displacement means at said first station for moving each article therefrom onto said magnet when said magnet is adjacent thereto, a stripping element at said second station for removing each article from said magnet and depositing it at said second station, an article-displacing cam positioned on said carrier element to displace each article from said second station, and synchronized driving means for actuating said carrier element and said displacement means.

2. Apparatus for transferring articles of magnetic material from a first to a second station comprising a carrier element rotatably mounted about an axis substantially equidistant from said stations, at least one magnet positioned on said carrier element to revolve closely over both of said stations upon rotation of said carrier element, lifting means at said first station for elevating each article therefrom onto said magnet when said magnet is adjacent thereto, a stripping element at said second station for removing each article from said magnet and depositing it at said second station, an article-displacing cam positioned on said carrier element to displace each article from said second station, and synchronized driving means for actuating said carrier element and said displacement means.

3. Apparatus for transferring articles of magnetic material from a first to a second station comprising a substantially horizontal carrier disc rotatably mounted closely above and about an axis substantially equidistant from said stations, a pair of magnets diametrically opposed on the underside of said carrier disc element to revolve closely over both of said stations upon rotation of said carrier element, lifting means at said first station for elevating each article onto said magnet when said magnet is adjacent thereto, a stripping element at said second station for removing each article from said magnet and depositing it at said second station, an article-displacing cam positioned on said carrier element to displace each article from said second station, and synchronized driving means for actuating said carrier element and said displacement means.

4. Apparatus for transferring articles of magnetic material from a first to a second station comprising a substantially horizontal carrier disc disposed closely above and rotatably mounted about an axis substantially equidistant between said stations, a pair of magnets diametrically opposed on the underside of said disc and positioned to revolve over both stations upon rotation of said disc, lifting means at said first station for elevating each article therefrom onto one of said magnets, a stationary stripping element at said second station extending into the path of the articles carried on the respective magnets, a pair of article-displacing cams depending from the underside of said disc circumferentially between said magnets, said cams being adapted to pass over said stations upon rotation of said disc and to displace from said second station each article deposited thereon by said stripping element, and a plurality of rotatable synchronized driving cams affixed to a common shaft for cyclically actuating said lifting element and disc.

5. In apparatus wherein articles of magnetic material are formed successively about an upright post, a transfer device for removing each article from said post and carrying it to a discharge station comprising a rotatable carrier element, at least one magnet positioned on said carrier element to revolve closely over both said post and said station upon rotation of said carrier element, a lifting element normally positioned at the base of said post and being movable immediately alongside said post to the upper end thereof to lift each formed article therefrom onto said magnet when said magnet is adjacent thereto, a stripping element at said second station for removing each article from said magnet and depositing it at said discharge station, and synchronized driving means for actuating said carrier element and said displacement means.

6. In apparatus wherein articles of magnetic material are formed successively about an upright post, a transfer device for removing each article from said post and carrying it to a discharge station comprising a carrier element rotatably mounted about an axis substantially equidistant from said post and discharge station, at least one magnet positioned on said carrier element to revolve closely over both said post and said station upon rotation of said carrier element, lifting means at said post for elevating each article therefrom onto said magnet when said magnet is adjacent thereto, a stripping element at said second station for removing each article from said magnet and depositing it at said discharge station, an article-displacing cam positioned on said carrier element to displace each article from said station, and synchronized driving means for actuating said carrier element and said displacement means.

7. In apparatus wherein articles of magnetic material are formed successively about an upright post, a transfer device for removing each article from said post and carrying it to a discharge station comprising a carrier disc disposed closely above and rotatably mounted about an axis substantially equidistant between said post and said discharge station, at least one magnet on the underside of said disc positioned to revolve over both said post and said discharge station upon rotation of said disc, a lifting element normally positioned at the base of said post and being movable to the upper end thereof to lift the formed article therefrom onto one of said magnets, a stationary stripping element at said discharge station extending into the path of the articles carried on the respective magnets, a pair of article-displacing cams on the underside of said disc adapted to pass over said stripping element and said post upon rotation of said disc and to displace from said discharge station each article deposited thereon by said stripping element, and a plurality of synchronized driving cams for cyclically actuating said lifting element while one of said magnets is over said post and then rotating said disc a half-turn.

8. In apparatus wherein articles of magnetic material are formed successively about an upright post, a transfer device for removing each article from said post and carrying it to a discharge station comprising a substantially horizontal carrier disc disposed closely above and rotatably mounted about an axis substantially equidistant between said post and said discharge station, a pair of magnets diametrically opposed on the underside of said disc and positioned to revolve over both said post and said discharge station upon rotation of said disc, a lifting element normally positioned at the base of said post and being movable immediately alongside said post to the upper end thereof to lift the formed article therefrom onto one of said magnets, a stationary stripping element at said discharge station extending into the path of the articles carried on the respective magnets, a pair of article-displacing cams depending from the underside of said disc circumferentially between said magnets, said cams being adapted to pass over said stripping element and said post upon rotation of said disc and to displace from said discharge station each article deposited thereon by said stripping element, and a plurality of rotatable synchronized driving cams affixed to a common shaft for cyclically actuating said lifting element while one of said magnets is over said post and then rotating said disc a half-turn.

References Cited in the file of this patent
UNITED STATES PATENTS

| | | |
|---|---|---|
| 1,983,471 | Kramer | Dec. 4, 1934 |
| 2,862,601 | Littwin et al. | Dec. 2, 1958 |
| 2,875,565 | Roskelley | Mar. 3, 1959 |